H. A. CARMICHAEL.
GEARING FOR TRACTORS.
APPLICATION FILED MAR. 21, 1918.
1,318,843.
Patented Oct. 14, 1919.
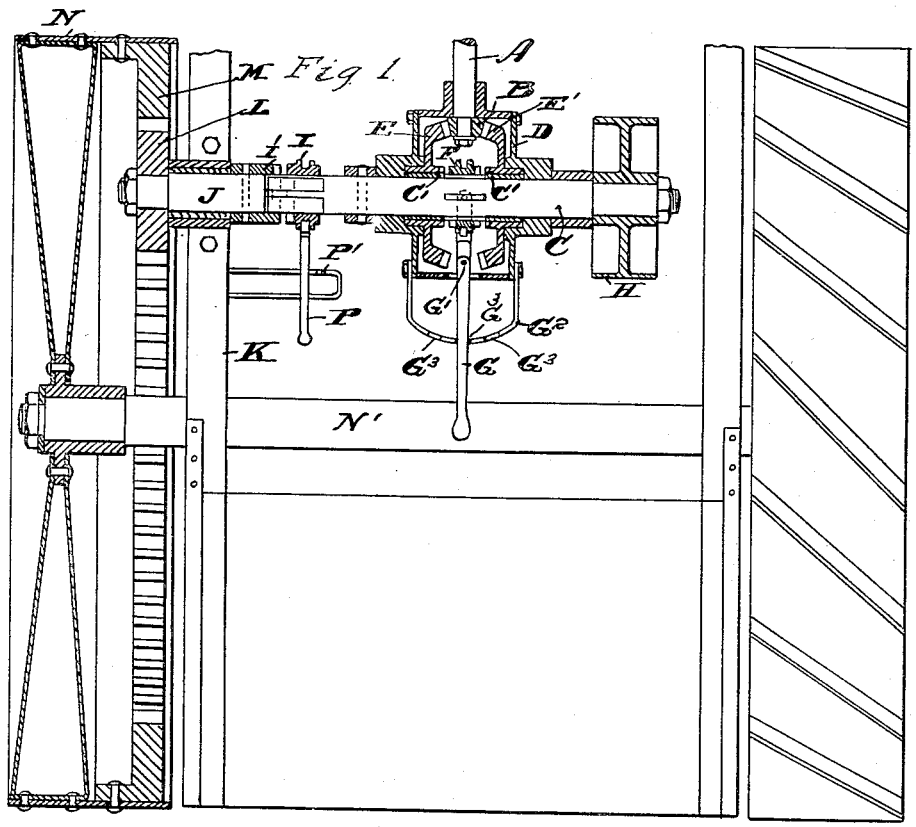
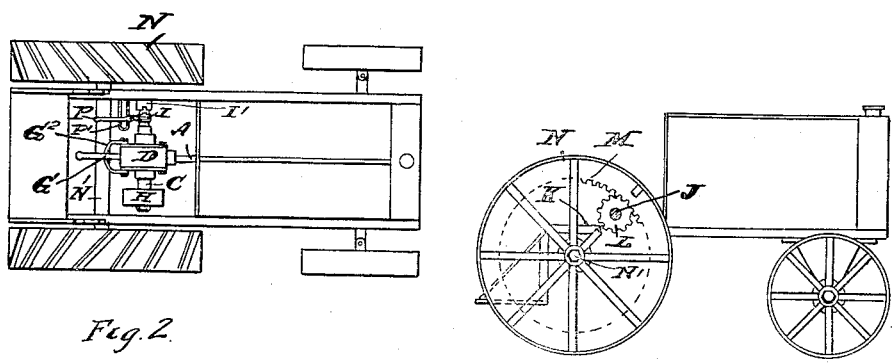
Inventor
Hugh A. Carmichael
By J. E. Thomas
Attorney

UNITED STATES PATENT OFFICE.

HUGH ALEXANDER CARMICHAEL, OF WEST LORNE, ONTARIO, CANADA.

GEARING FOR TRACTORS.

1,318,843.   Specification of Letters Patent.   Patented Oct. 14, 1919.

Application filed March 21, 1918. Serial No. 223,701.

*To all whom it may concern:*

Be it known that I, HUGH A. CARMICHAEL, a British subject, residing at West Lorne, county of Elgin, Province of Ontario, Canada, have invented a certain new and useful Improvement in Gearing for Tractors, and declare the following to be a full, clear, and exact description of the same, such as will enable others skilled in the art to which it pertains to make and use the same, reference being had to the accompanying drawings, which form a part of this specification.

This invention relates to gearing for tractors as shown in the accompanying drawings and more particularly described in the following specification and claims.

One of the objects of this invention is to provide a simple, inexpensive and efficient transmission for a power propelled vehicle of the class described in which a great number of the parts ordinarily employed have been eliminated.

With the foregoing and other objects in view which will appear as the description proceeds, the invention resides in the combination and arrangement of parts and in the details of construction hereinafter described and claimed, it being understood that changes may be made in the precise embodiment herein disclosed without departing from the spirit of the invention.

In the accompanying drawings forming part of the specification:—

Figure 1 is a horizontal cross-sectional view through the transmission gearing and driving connection with the tractor wheel.

Fig. 2 is a plan view of the tractor on a relatively smaller scale showing the general arrangement of the parts.

Fig. 3 is a side elevation of the tractor.

Referring now to the letters of reference placed upon the drawings:—

A, denotes the main driving shaft, B the driving pinion mounted on the end of the shaft A. C, indicates a transverse shaft journaled in the gear housing D,—which is in turn suitably supported by the frame of the tractor.

E, E', are opposing gears in mesh with the pinion B, but loosely mounted upon the shaft C, within the gear housing D. F, designates a sliding clutch keyed to the shaft C, adapted to be thrown into interlocking engagement with a co-acting clutch member C', carried by each of the gears E, and E', upon the adjustment of the manually operated lever G,—pivoted at G', in the gear housing. G², denotes a quadrant having notches G³, adapted to hold the lever, when manually adjusted, so that the clutch F, may be held either in engagement with the gear E, or the gear E', or be otherwise maintained in a neutral or non-operative relation to both gears. H, is a pulley mounted upon the end of the shaft C, which may be connected by a suitable belt (not shown) for the operation of a saw or other mechanism.

I, denotes a sliding clutch keyed to the opposite end of the shaft C, adapted to interlock with a co-acting clutch member I', carried by a relatively short shaft J,—in axial alinement with the shaft C,—suitably journaled and supported by the frame K. L, indicates a driving pinion on the end of the shaft J, in mesh with an internal gear M, bolted to the tractor wheel N, which is in turn loosely mounted upon the axle N'. P, indicates a lever for manually shifting the clutch I, and P', indicates a notched quadrant for securing the clutch when adjusted.

Having indicated the several parts by reference letters the construction and operation of the device will be readily understood. For tractor purposes a single speed, forward and reverse movement is all that is ordinarily required;—and by constructing a tractor with a relatively short lateral tread between its driving and supporting wheels it has been indicated in practice that the use of a differential gear as employed in automobile construction is unnecessary.

I have therefore been enabled to materially reduce the cost of manufacture by eliminating the gearing that such constructions would otherwise entail.

The few gears employed may be run in oil contained in the supporting housing and as the gears are always in mesh and the clutch can only serve to operate one of the gears at a time, there is no danger of stripping the teeth of the gears through carelessness on the part of the operator.

When it is desired to drive the tractor either in a forward or reverse direction the lever P, is actuated to lock the shaft C, in driving relation with the short shaft J, by means of the clutch I, and co-acting member I'.

The lever G, is then adjusted to the right or left as required to shift the clutch F, into engagement with either the gear E, or the gear E', thereby locking the gear in driving relation with the shaft C, that it may actuate the pinion L, (in mesh with the internal gear M, of the traction wheel N), in either a forward or in a reverse direction as may be necessary.

When it is desired to stop the movement of the tractor, or to employ its driving power for purposes other than drawing a load,—as for example the operation of a saw by means of the driving pulley H, the lever P, is operated to release the clutch I, from engagement with the short shaft J, thus the shaft C, is free to operate to drive the pulley H, without operating the tractor wheels.

Having thus described my invention what I claim is:—

1. In a tractor having a reversing unit, including a transversely extending driven shaft, a relatively short shaft suitably journaled in axial alinement with one end of the transverse shaft, a pinion carried by the short shaft, a supporting axle for said tractor, a traction wheel mounted on the axle, an internal gear on the traction wheel in mesh with the pinion on the short shaft, a pulley on the free end of the transverse driven shaft, and a manually controlled clutch mechanism adapted to couple the shafts to drive the tractor or release them to permit use of the pulley when the tractor is stationary.

2. In a tractor having a reversing unit, including a transversely extending driven shaft, a relatively short shaft in axial alinement with the transverse shaft, means for operatively connecting the short shaft with a traction wheel of the tractor, a manually operable clutch mechanism adapted to couple the shafts to drive the tractor, and a pulley carried by the free end of said transverse driven shaft and operable as and for the purpose set forth.

In testimony whereof, I sign this specification in the presence of two witnesses.

HUGH ALEXANDER CARMICHAEL.

Witnesses:
F. H. HURE,
W. R. MACDONALD.